July 31, 1962 V. K. ELORANTA 3,046,861
PHOTOGRAPHIC PRODUCT

Filed May 7, 1959 4 Sheets-Sheet 1

INVENTOR.
Vaito K. Eloranta
BY Brown and Mikulka
Robert E. Corb
ATTORNEYS

July 31, 1962   V. K. ELORANTA   3,046,861
PHOTOGRAPHIC PRODUCT
Filed May 7, 1959   4 Sheets-Sheet 2
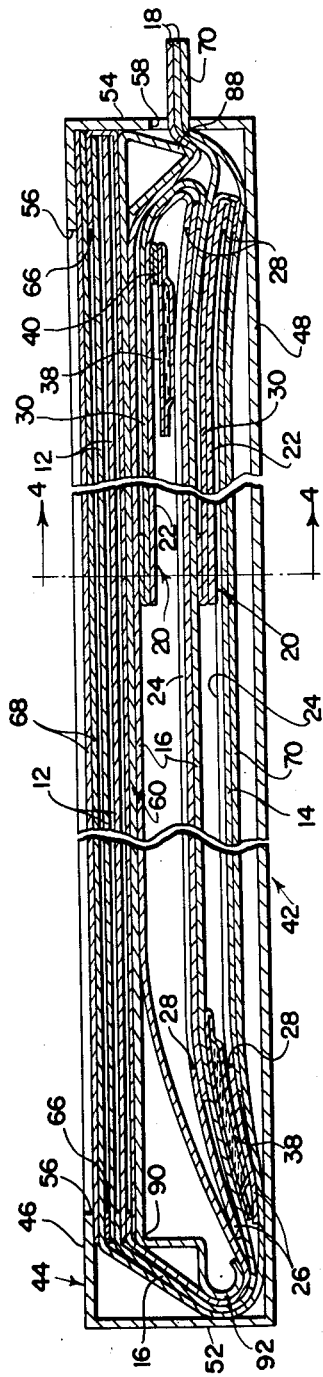
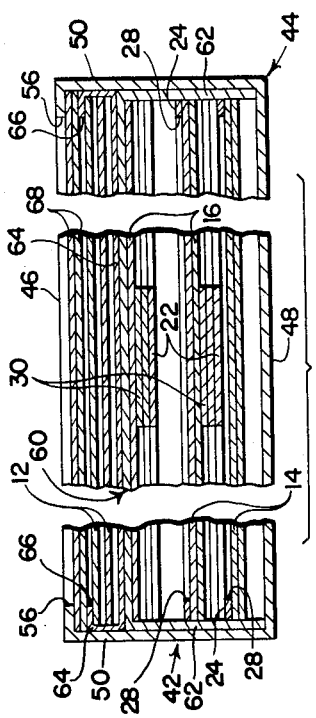
INVENTOR.
Vaito K. Eloranta
BY
ATTORNEYS July 31, 1962 V. K. ELORANTA 3,046,861
PHOTOGRAPHIC PRODUCT
Filed May 7, 1959 4 Sheets-Sheet 4

INVENTOR.
Vaito K. Eloranta
BY
Brown and Mikulka
and
Robert E. Corb
ATTORNEYS

United States Patent Office 3,046,861
Patented July 31, 1962

3,046,861
PHOTOGRAPHIC PRODUCT
Vaito K. Eloranta, Needham, Mass., assignor to Polaroid Corporation, Cambridge, Mass., a corporation of Delaware
Filed May 7, 1959, Ser. No. 811,707
5 Claims. (Cl. 95—13)

This invention relates to photographic products and more particularly to photographic film assemblages including photosensitive materials adapted to be exposed and processed for producing photographic images.

The present invention is generally concerned with photographic film assemblages including a plurality of photosensitive elements adapted to be exposed in succession and, following exposure, to be processed by fluids included in said assemblage. Each of said photosensitive elements comprises a portion of a film unit including a second element adapted to be superposed with the photosensitive element for aiding in the distribution of a processing fluid between the elements and a rupturable container of the processing fluid adapted to be distributed between the superposed elements, following exposure of the photosensitive element, preferably for producing a visible image comprising a transfer print formed, for example, by silver halide diffusion-transfer. The film assemblage comprises means for enclosing the film units with the elements thereof so arranged in overlying relation that each photosensitive element can be exposed and thereafter superposed with a second element during withdrawal of the film unit comprising said elements from the assemblage.

An object of the invention is to provide a photographic film assemblage including a plurality of photosensitive elements, second elements adapted to be superposed with the photosensitive elements for aiding in the distribution of a processing fluid between the superposed elements and rupturable containers of the processing fluid, and having an improved construction characterized by its compactness and thinness.

Another object of the invention is to provide photographic film assemblages of the type described wherein the photosensitive and second elements are arranged in overlying relation and the overall thinness of the assemblage is achieved by spacing containers of the film units apart from one another toward opposite ends of the assemblage so that containers do not overlie one another.

Further objects of the invention are: to provide a film assemblage of the type described including a plurality of film units each comprising a photosensitive element, a second element and a container of processing fluid and wherein the containers of alternate film units are spaced toward one end of the assemblage from the containers of adjoining film units; and to provide a film assemblage of the type described wherein the elements of each film unit are joined by a connecting element for positioning the photosensitive and second elements in superposition during withdrawal of the film unit from the assemblage and the container comprising each film unit is mounted on the connecting element.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is a fragmentary sectional view of a film assemblage embodying the invention, the section being taken substantially midway between the sides of the assemblage;

FIG. 4 is a view taken along the line 4—4 of FIG. 3;

Figure 1:
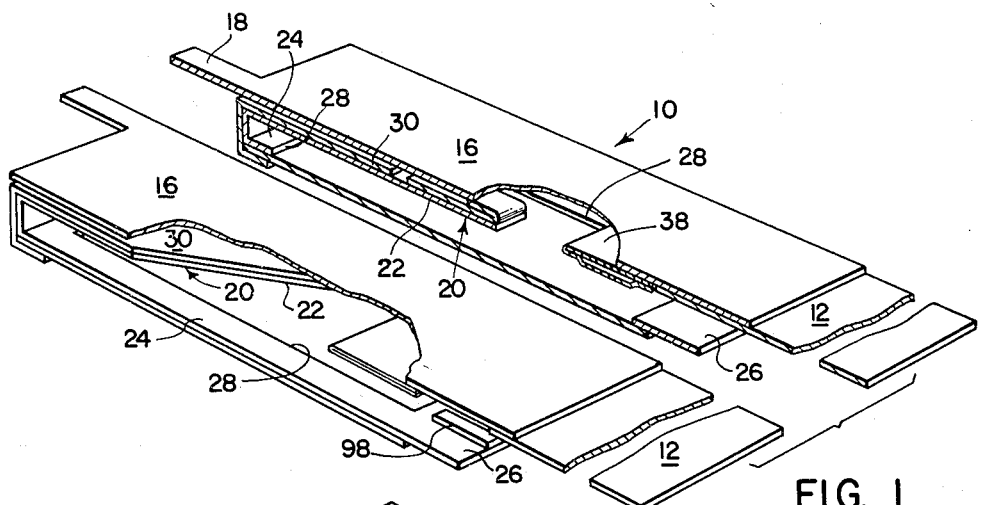
FIGURE 1 is a fragmentary, perspective view, partially in section, of a component of a film assemblage embodying the invention.

Reference is now made to FIGURES 1 through 6 of the drawings wherein there is illustrated a film assemblage embodying the invention and adapted to be employed in photographic apparatus such as a camera. The film assemblage, designated 42 in FIGS. 3 through 7, comprises a plurality of film units 10 (see FIGS. 1 and 2), each including a photosensitive sheet 12 and a second or image-receiving sheet 14. The photosensitive sheet is generally rectangular and comprises a layer of photosensitive material carried on a suitable support. The photosensitive material may comprise any of the materials usually employed in photography including, for example, the silver halides or other photosensitive heavy metal salts capable of having a developable latent image formed therein by exposure to actinic light, the ferric salts and the diazonium compounds. The support for the photosensitive layer may comprise any of the flexible sheet materials generally used for film base, including paper, plastics, metallic foils and the like, and is preferably opaque to light actinic to the photosensitive material or includes a layer which is opaque to actinic light. Second sheet 14 is at least coextensive in area with the area or frame of the photosensitive sheet which is to be exposed and also comprises a flexible sheet material such as paper, plastic and the like. The second sheet in the form shown is substantially equal in width to, but slightly shorter than, the photosensitive sheet and is also opaque to light actinic to the photosensitive material. While the second sheet may merely aid in the spreading of a fluid processing composition in a thin layer on the photosensitive sheet, in a preferred form of the film unit the second sheet is adapted to provide a support for a positive transfer image produced, for example, by a silver halide diffusion-transfer reversal process such as described in U.S. Patents Nos. 2,543,181, issued February 27, 1951 and 2,662,822, issued December 15, 1953, both in the name of Edwin H. Land. The second sheet accordingly may comprise an image-receiving layer such as described in the above-mentioned patents carried on a flexible support sheet.

Photosensitive sheet 12 is mounted on a first carrier sheet 16, formed of a flexible sheet material such as paper, plastic and the like, and preferably of a material such as glassine paper which has a highly calendered, smooth surface. First carrier sheet 16 may be adapted to perform a multiplicity of functions including providing a leader for connecting the photosensitive and second sheets, positioning the photosensitive sheets relative to one another, moving the film unit within a camera or other apparatus, withdrawing the film unit from the camera or apparatus, mounting a container of a fluid processing composition and, in one embodiment, collecting any excess processing fluid. In the form shown in FIGS. 1 and 3, carrier sheet 16 is substantially equal in width to photosensitive sheet 12 and is provided at one end, called its leading end, with a narrower leader portion 18. The opposite or trailing end of the carrier sheet is secured to the leading end of photosensitive sheet 12. This may be accomplished by adhering the photosensitive sheet directly to the carrier sheet by a suitable adhesive or by providing a narrow connecting member or strip. In an alternative embodiment of film unit 10, carrier sheet 16 may be of sufficient length so as to extend behind and beyond the trailing edge of the photosensitive sheet providing a trailing end portion for collecting excess processing fluid in a manner to be described hereinafter. In this last-mentioned embodiment, the photosensitive and image-receiving sheets may be substantially equal in length.

A second carrier sheet 20 is provided for mounting second or image-receiving sheet 14 and, like first carrier sheet 16, is adapted to perform a multiplicity of functions which include determining the area of the photosensitive and second sheets which are to be processed by a layer of the processing fluid spread between the sheets. Carrier sheet 20 comprises a tapered leading end section 22, an intermediate section 24 at least coextensive with second sheet 14 and a relatively short trailing end section 26. Second sheet 14 is mounted on intermediate section 24 with the image-receiving layer of sheet 14 disposed adjacent carrier sheet 20. Intermediate section 24 is provided with a generally rectangular aperture 28 defining the area of the image-receiving sheet in contact with which the fluid processing composition is spread and wherein a transfer image may be produced. The lateral margins of intermediate section 24 bordering the sides of aperture 28 cooperate in a manner to be described for confining the processing fluid between the sheets and for controlling the thickness of the layer of fluid spread between the sheets. Trailing end section 26 extends beyond the trailing edge of second sheet 14 and is adapted to co-operate with either the trailing end of the photosensitive sheet or, in the alternative embodiment, with the trailing end of first carrier sheet 16, for collecting excess processing fluid.

The end of tapered leading end section 22 is secured to first carrier sheet 16 intermediate the leading end of the first carrier sheet and the leading edge of photosensitive sheet 12 with the photosensitive layer of the photosensitive sheet and the image-receiving layer of the second sheet in face-to-face relation and with the leading edges of photosensitive and second sheets 12 and 14 substantially in alignment with one another. In the assembled form of the film unit shown, the trailing edge of second carrier sheet 20 should be disposed substantially in alignment with the trailing edge of photosensitive sheet 12. In the alternative embodiment wherein the photosensitive and second sheets are of substantially equal length and first carrier sheet 16 extends behind and beyond the trailing edge of the photosensitive sheet, the trailing edge of second carrier sheet 20 is in substantial alignment with the trailing edge of the first carrier sheet.

A tapered leader sheet 30, substantially coextensive with tapered leading end section 22 of carrier sheet 20, is provided secured at its trailing end to the leading edge of second sheet 14 at the surface thereof opposite carrier sheet 20, and at its leading edge to carrier sheet 16 at approximately the same location as is the leading edge of leading end section 22. Leader sheet 30 is provided with a tapered tear-out portion designated 32 and defined by a series of die cut lines 34 which extend from an aperture 36 in leader sheet 30 intermediate its ends and sides. Die cut lines 34 extend from aperture 36 outwardly toward the margins of leader sheet 30 where the latter is attached to second sheet 14. Tear-out section 32 provides means whereby, following processing of the photosensitive and image-receiving sheets, the image-receiving sheet may be separated from the photosensitive sheet and second carrier sheet 20. This is accomplished, for example, by inserting a fingernail into aperture 36 so as to grasp the narrowest portion of tear-out section 32 and tearing the latter along die cut lines 34 toward the leading edge of second sheet 14, and then employing the tear-out portion for peeling the second sheet away from carrier sheet 20 and photosensitive sheet 12. The bond between the tear-out portion of leader sheet 30 and the leading edge of the image-receiving sheet will, of course, be stronger than the bond between the image-receiving sheet and second carrier sheet 20 in order for stripping to occur.

Figure 2:
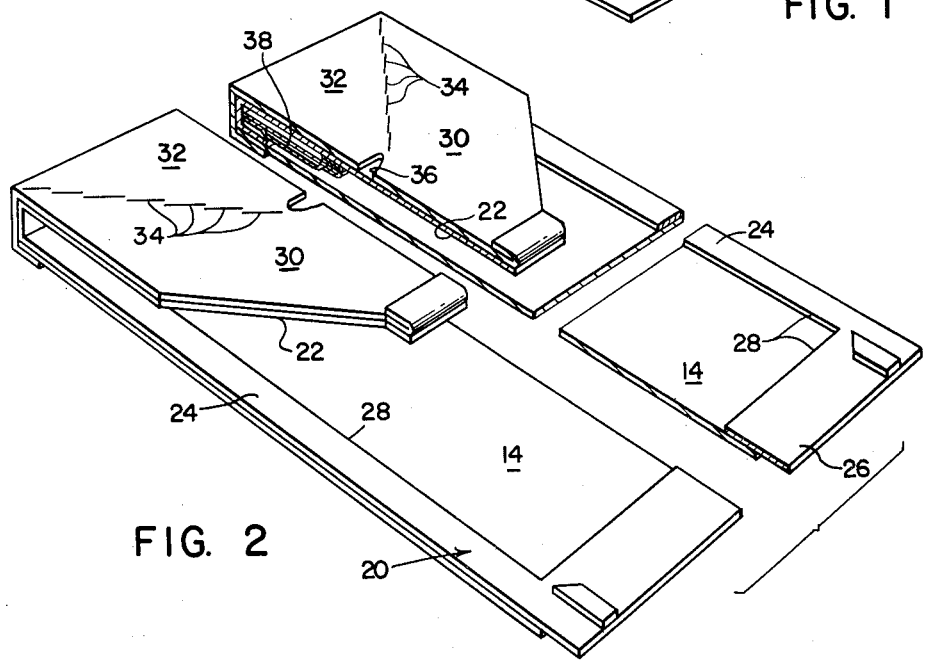
FIG. 2 is a fragmentary perspective view of a portion of the component shown in FIG. 1.
Figure 5:
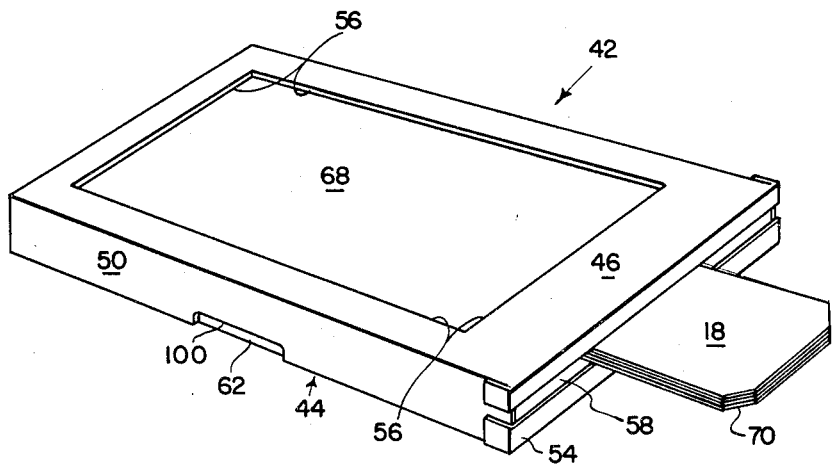
FIGS. 5 and 6 are front and rear perspective views, respectively, of the film assemblage of FIG. 3.
Figure 6:
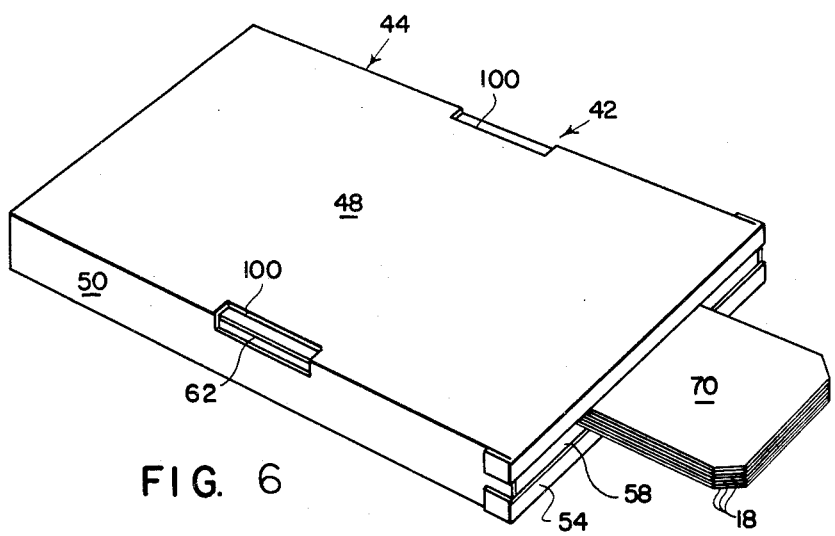
Figure 7:
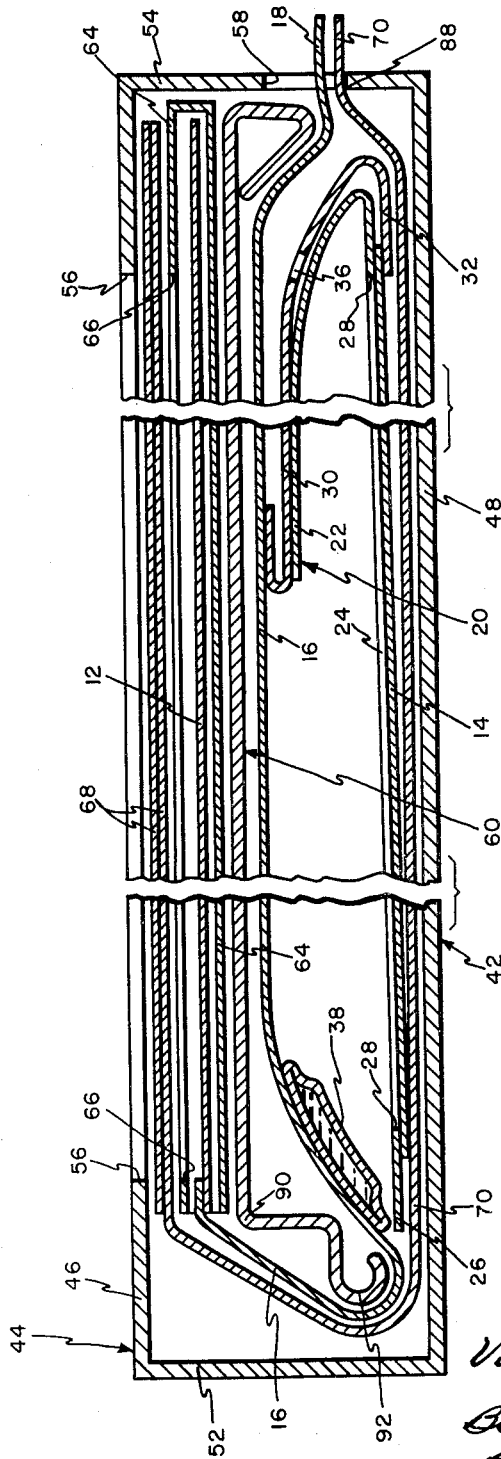
FIG. 7 is a view similar to FIG. 3 showing a film assemblage comprising a single film unit with the components of the film assemblage spaced apart from one another to illustrate more clearly the construction of the assemblage.

The photosensitive and second sheets are adapted to be processed by a fluid composition carried in a rupturable container 38 mounted on either of carrier sheets 16 and 20 adjacent the leading edge of the photosensitive or second sheet which is secured to the particular carrier sheet. Container 38 is formed substantially as shown in the above-mentioned U.S. Patent No. 2,543,181 and comprises a rectangular blank of fluid- and vapor-impervious sheet material, folded longitudinally upon itself to provide two walls which are bonded together at their margins to form an elongated cavity for the processing fluid. The longitudinal seal is weaker than the shorter end seals and is adapted to become unsealed in response to hydraulic pressure generated within the fluid contents of the container by the application of compressive pressure to the container. Container 38, in the form shown in FIG. 1, is mounted on first carrier sheet 16 intermediate the leading edge of photosensitive sheet 12 and the point at which the second carrier sheet is secured to the first carrier sheet. The container extends substantially from side to side of the carrier sheet and the fluid cavity of the container is preferably at least as wide as aperture 28 in the intermediate section of the second carrier sheet. The longitudinal edge of the container, which is adapted to become unsealed, is located facing the photosensitive sheet and closest the leading edge thereof. In an alternative form of film unit, container 38 is mounted on leading end section 22 of second carrier sheet 20 adjacent the leading edge of second sheet 14. Container 38, as shown in FIG. 2, is secured to carrier sheet 20 with the longitudinal edge of the container, which is adapted to become unsealed, located nearest the second sheet by a hinge strip 40 secured at the opposite longitudinal edge of the container.

Film unit 10, when assembled in position for exposure, is disposed with carrier sheet 16 folded adjacent the leading edge of photosensitive sheet 12 so that the photosensitive sheet faces away from the image-receiving sheet in the same direction as the latter. In this position of the film unit, first carrier sheet 16 extends between the photosensitive and image-receiving sheets toward the leading end of the image-receiving sheet and the trailing end of the photosensitive sheet. Leading end section 22 of second carrier sheet 20 is folded inwardly between the photosensitive and print-receiving sheets toward the trailing end of the image-receiving sheet and the leading end of the photosensitive sheet so that leading end section 22, leader sheet 30 and container 38 are disposed between the photosensitive and second sheets which are located to the outside of the film unit. Leader portion 18 of first carrier sheet 16 projects from between the leading end of the image-receiving sheet and the trailing end of the photosensitive sheet to provide means for manipulating the film unit so as to position the photosensitive and image-receiving sheets in superposed, aligned relation.

A plurality of film units 10 are assembled in the form of a film pack 42 shown in FIGS. 3 through 7 of the drawings. Film pack 42 comprises means in the form of a generally parallelepiped shaped box or container 44 for enclosing the film units. Container 44 is adapted to fabrication from thin sheet material such as stiff paper, cardboard, sheet metal, plastic and the like, and comprises a rectangular forward wall 46 and a rear wall 48, joined by side walls 50, a trailing end wall 52 and a leading end wall 54. A rectangular exposure aperture 56 is provided in forward wall 46 for exposing the photosensitive sheets of film units positioned within container 44 and leading end wall 54 is provided with a slot 58 intermediate the forward and rear walls for withdrawing film units from the container.

Mounted within container 44 is a substantially flat and rigid pressure plate 60 having dependent flanges 62. Pressure plate 60 is so dimensioned and disposed within the container as to extend substantially from end to end thereof with flanges 62 located closely adjacent the side walls of the container and extending rearwardly so as to abut against rear wall 48.

Each film unit 10 of the film pack is disposed within container 44 with the photosensitive sheet of the film unit located forward of pressure plate 60 between the latter and forward wall 46. The first carrier sheet 16 of each film unit is bent around the trailing end of the pressure plate, and the second sheet 14, first carrier sheet 16, second carrier sheet 20 and container 38 are disposed behind the pressure plate between the latter and rear wall 48. Each of the plurality of film units 10 provided in box 44 is arranged in the same manner, with the photosensitive sheets disposed in one stack forward of the pressure plate and the second sheets disposed in another stack to the rear of the pressure plate. The photosensitive sheets in this position extend across aperture 56 in position to be exposed through the aperture and the second sheets are loosely contained to the rear of the pressure plate between flanges 62.

In order to reduce the overall thickness of the assemblage, which thickness is due in large part to the thickness of container 38, the containers of adjacent film units are positioned toward opposite ends of the assemblage so that they do not overlie one another. Thus, the container 38 of one film unit will be mounted on first carrier sheet 16 and the container of any adjacent film unit will be mounted on leading end section 22 of second carrier sheet 20. Means are provided for preventing light from entering aperture 56 and/or 58 and exposing the photosensitive sheets. In the form shown in FIGS. 3, 4 and 7, this means comprises an envelope 64 secured around the stack of photosensitive sheets 12 within box 44. Envelope 64 is provided with an aperture 66 in its forward wall which is substantially coextensive with aperture 56 in forward wall 46 whereby the photosensitive sheets positioned within the envelope may be exposed. A pair of cover sheets 68 are provided located in superposed relation across aperture 56 and aperture 66 between forward wall 46 of box 44 and the forward wall of envelope 64. Envelope 64 and cover sheets 68 are formed of a light-opaque material, for example black paper, plastic and the like, and two cover sheets are provided in superposition in order to preclude any chance of exposure of the foremost photosensitive sheet due to minute holes in the cover sheets. Leader 70 is connected to the leading ends of the cover sheets at a location near the trailing end of the film pack and extends around the trailing end of the pressure plate between the second sheets and rear wall 48 of box 44 and thence through slot 58 at the leading end of the box. While there is little or no possibility of light entering slot 58, exposing the photosensitive sheets, this is positively precluded by the arrangement of envelope 64 and cover sheets 68 whose primary function is to cooperate with forward wall 46 to provide a lighttight baffle sealing exposure aperture 56 against the admission of light.

The film pack of the invention is adapted to be employed in a camera or other lighttight apparatus having an opening through which leaders 18, and the film units which said leaders comprise, may be withdrawn from the apparatus. When a film pack has been positioned in the apparatus, cover sheets 68 are withdrawn from the pack by drawing on leader 70 which projects through slot 58 in leading end wall 54. The cover sheets are thus drawn around the trailing end of pressure plate 60 behind the latter and from container 44, thereby leaving aperture 56 uncovered and permitting exposure of the photosensitive sheets. Following exposure of the foremost photosensitive sheet 12 located adjacent forward wall 46, the leader portion 18 and first carrier sheet 16 comprising the same film unit as the exposed photosensitive sheet are drawn through slot 58 from container 44. As first carrier sheet 16 moves through slot 58, the photosensitive sheet 12 connected thereto is drawn around the trailing end of the pressure plate behind the pressure plate into superposed registered relation with the second plate into superposed registered relation. In the form of film sheet 14 comprising the film unit. In the form of film pack shown in FIG. 3, as the photosensitive sheet is being moved into registration with the second sheet, container 38, mounted on first carrier sheet 16, is moved toward the leading end of the second sheet, and second carrier sheet 20 and leader sheet 30 are caused to roll progressively from the leading end thereof toward their trailing ends while the second sheet 14 remains substantially motionless within container 44.

Rolling of second carrier sheet 20 and leader sheet 30 should start along a transverse line at the leading ends of the sheets in the region of their attachment to first carrier sheet 16, necessitating that the second carrier sheet 20 and leader sheet 30 have a tendency to "break" or fold and roll more readily at this location. It is for this reason that the second carrier sheet and leader sheet are tapered so as to provide the least resistance to folding or breaking at their narrowest portions which occur at their point of attachment to the first carrier sheet.

While the foremost photosensitive sheet 12 is being drawn around the trailing end of the pressure plate into superposed and registered relation with the second sheet 14 comprising the same film unit, the second sheet and the remaining photosensitive sheets are required to be held substantially stationary with respect to the pressure plate and container 44. Accordingly, means are provided for holding the rearmost second sheet 14 substantially stationary with respect to container 44 while the photosensitive sheet 12, comprising the same film unit, is moved into superposition with the second sheet between the latter and rear wall 48 of the container. This last-mentioned means comprises a portion of pressure plate 60 at the leading edge thereof folded rearwardly and thence toward the pressure plate to provide a rearwardly projecting ramp 88 at the leading end of the pressure plate for displacing the leading end of the rearmost second sheet 14 to the rear of slot 58 so that the leading end of the second sheet is out of alignment with slot 58 and is engaged by leading end wall 54 for preventing movement of the second sheet during movement of first carrier sheet 16 and the foremost photosensitive sheet 12. When second carrier sheet 20 and leader sheet 30 have been completely unrolled and withdrawn through aperture 58, continued withdrawal of the second carrier sheet and leader sheet is effective to bend the leading end of the carrier sheet sufficiently to move the latter, in superposition with the photosensitive sheet comprising the same film unit, through slot 58 from container 44.

Means are provided on pressure plate 60 at the trailing end thereof for cooperating with the photosensitive sheets to prevent movement of the photosensitive sheets during withdrawal of the foremost photosensitive sheet from the film pack. This last-mentioned means comprises providing a corner 90 having an abrupt edge located at the trailing end of pressure plate 60 in alignment with the leading edges of photosensitive sheets 12. The trailing end section 92 of pressure plate 60 is shaped so as to guide first carrier sheet 16 rearwardly and causing it to bend at the leading edge of the photosensitive sheet 12 to which it is attached. Trailing end section 92 of pressure plate 60 is curved at its rearmost portion to facilitate movement of the photosensitive sheets around the trailing end of the pressure plate. The configuration of trailing end section 92 and corner 90 is such that tension on outermost carrier sheet 16 causes all the photosensitive sheets to be drawn against pressure plate 60 at corner 90, necessitating that the photosensitive sheets bend at this corner in order to move around the corner.

The photosensitive sheets, because of their inherent stiffness, provide sufficient resistance to such bending to preclude any movement of the photosensitive sheets due to friction with the foremost photosensitive sheet as the latter is being moved. Because the foremost or outermost photosensitive sheet is not compressed against the pressure plate at corner 90 by any other photosensitive sheet or carrier sheet 16 and is more remote from corner 90, it does not have to bend so sharply, with the result that it is free to bend more easily so as to move around the corner when drawn around the corner by first carrier sheet 16 attached to the foremost photosensitive sheet.

The film pack is adapted to be employed in photographic apparatus such as the camera which includes means for spreading the fluid contents of the container of each film unit between the photosensitive and second sheets of the film unit. This fluid-spreading means comprises a pair of juxtaposed members between which the photosensitive and second sheets are moved in superposition for spreading the fluid and may be biased toward one another or may be spaced a fixed distance apart so as to provide a fixed gap through which the sheets are moved. The fluid to be spread between the photosensitive and second sheets is quite viscous and is provided between the sheets so that as the sheets are moved between the pressure-applying members, the fluid is caused to be spread in a thin layer, the thickness of which is a function of the compressive pressure applied by the pressure-applying members and of intermediate section 24 of second carrier sheet 20 located between sheets 12 and 14 during fluid spreading. Intermediate section 24 functions as a mask for spacing apart the pressure-applying members and for defining the areas of the photosensitive and second sheets in which processing occurs by limiting the area of contact between the fluid and second sheeet 14 to the region within aperture 28 in intermediate section 24.

As the sheets with the fluid container therebetween are moved between the pressure-applying members, the fluid contents of container 38 are ejected from the container and are advanced relative to and between the photosensitive and second sheets. In order to insure a complete spread of the fluid in a layer of the desired thickness over a predetermined area which is preferably coextensive with aperture 28, the fluid is usually provided in the container in an amount greater than the minimum required for the desired layer. This necessitates the provision of means for collecting any excess fluid which may be spread beyond the end of the desired area to prevent the same from being squeezed from the trailing end of the film unit. This last-mentioned means for collecting and retaining excess fluid comprises trailing end section 26 of second carrier sheet 20 and the corresponding trailing end section of photosensitive sheet 12. In the alternative embodiment previously described wherein first carrier sheet 16 extends behind and beyond the trailing end of the photosensitive sheet, the trailing end portion of the first carrier sheet cooperates with trailing end section 26 to provide the means for trapping and retaining excess processing fluid. Provision is made for spacing apart the trailing end sections of the sheets comprising the fluid-collecting means as these trailing end sections are moved between the pressure-applying members so as to provide a space between the trailing end sections in which excess fluid is collected. This last-mentioned means in the form shown comprises a pair of spacing elements 98 mounted on trailing end section 26 adjacent the margins thereof. Where the film unit is to be used with pressure-applying members of the type which are spaced a fixed minimum distance apart, which distance is greater than the combined thickness of the two trailing end sections comprising the fluid-collecting means, spacing members 98 may be unnecessary.

Pressure plate 60 is provided in the film pack for supporting photosensitive sheets 12 in position for exposure against forward wall 46 across aperture 56. Resilient means are provided in the camera for biasing the pressure plate toward forward wall 46 and, for this purpose, openings 100 are provided in the rear of the film pack at the intersection of each of side walls 50 and rear wall 48. Openings 100 permit resilient members in the camera to engage flanges 62 on pressure plate 60 for biasing the pressure plate toward the front of the film pack.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A photographic film assemblage comprising, in combination, at least two film units each including a photosensitive sheet positioned for exposure within said assemblage, a second sheet arranged for superpositioning with said photosensitive sheet for aiding in the distribution of a processing fluid between said sheets, a connecting sheet joined to the leading ends of said photosensitive and second sheets for predeterminedly locating said sheets relative to one another in superposition, and a rupturable container of a processing fluid mounted on said connecting sheet; and means enclosing and positioning said film units with said photosensitive sheets arranged in overlying stacked relation with the leading ends of said photosensitive sheets located adjacent one another at one end of said assemblage, said second sheets arranged in overlying stacked relation with the leading ends of said second sheets located adjacent one another at the opposite end of said assemblage, the stacked photosensitive and second sheets arranged in overlying relation and said connecting sheet of each of said film units disposed between the photosensitive and second sheets of said each film unit in overlying stacked relation with said second sheet of said each film unit, the container of one of said film units being mounted on said connecting sheet of said one film unit adjacent the leading end of said photosensitive sheet of said one film unit and said container of the other of said film units being mounted on said connecting sheet of said other film unit adjacent said leading end of said second sheet of said other film unit, whereby the container of said one film unit is spaced from the container of said other film unit toward the opposite end of said assemblage.

2. The photographic film assemblage of claim 1 wherein said containers of adjacent film units are mounted on said connecting sheets at positions spaced toward opposite ends of said assemblage, said means for enclosing and positioning said film units comprise a housing having an exposure aperture for transmitting light to said photosensitive sheets and a second aperture located at the end of said assemblage adjacent the leading ends of said second sheets through which said film units can be withdrawn with said photosensitive and second sheets of each film unit in superposition, said stacked photosensitive sheets being arranged in alignment with said first aperture, and a dividing element is provided disposed between said photosensitive sheets and said second and connecting sheets on the side of said photosensitive sheets furthest from said exposure aperture, said connecting sheets extending around the end of said dividing element furthest from said second aperture and adjacent said leading ends of said photosensitive sheets.

3. The photographic film assemblage of claim 1 wherein each of said containers includes a discharge mouth, said containers are mounted on said connecting sheets with said discharge mouths facing toward said one end of said assemblage and a hinge is provided for mounting the container located adjacent said leading end of said second sheet.

4. A photographic film assemblage comprising, in combination, a plurality of film units arranged to be exposed successively within said assemblage and following exposure to be withdrawn in succession therefrom for processing, each of said film units including a photosensitive sheet positioned for exposure within said assemblage, a second sheet arranged for superpositioning with said photosensitive sheet during withdrawal of said each film unit from said assemblage for aiding in the distribution of a processing fluid between said sheets, a connecting sheet joined to the leading ends of said photosensitive and second sheets for aligning said photosensitive and second sheets in superposition during withdrawal of said each film unit from said assemblage, and a rupturable container of said processing fluid mounted on said connecting sheet adjacent said leading end of one of said photosensitive and second sheets; a housing for enclosing and positioning said film units, said housing including an exposure aperture in one side for transmitting light for exposing said photosensitive sheets and a withdrawal aperture in one end through which said film units may be withdrawn, said photosensitive sheets being arranged in said housing in overlying stacked relation in alignment with said exposure aperture and with said leading ends of said photosensitive sheets located adjacent one another at the opposite end of said housing from said withdrawal aperture, said second sheets being arranged in overlying stacked relation with the leading ends of said second sheets located adjacent one another and said one end of said housing in position to be withdrawn through said withdrawal aperture, the stacked photosensitive and second sheets being arranged in overlying relation with said stacked second sheets being located to the side of said stacked photosensitive sheets opposite said exposure aperture, said connecting sheet of each of said film units being disposed between the photosensitive and second sheets of said each film unit in overlying stacked relation with said second sheet of said each film unit, the container of succeeding film units being mounted on said connecting sheets at positions spaced from one another toward opposite ends of said assemblage so as to reduce the overall thickness of said assemblage.

5. The photographic film assemblage of claim 1 wherein each of said containers includes a discharge mouth, said containers are mounted on said connecting sheets with said discharge mouths facing toward said opposite end of said assemblage, and a hinge is provided for mounting those containers which are located adjacent said leading ends of said second sheets.

References Cited in the file of this patent
UNITED STATES PATENTS

| | | |
|---|---|---|
| 1,836,699 | Wood | Dec. 15, 1931 |
| 2,155,078 | Brown | Apr. 18, 1939 |
| 2,495,113 | Gannon | Jan. 17, 1950 |
| 2,558,856 | Land | July 3, 1951 |
| 2,600,996 | Land | June 17, 1952 |
| 2,612,449 | Land | Sept. 30, 1952 |
| 2,612,451 | Land | Sept. 30, 1952 |

UNITED STATES PATENT OFFICE
CERTIFICATE OF CORRECTION

Patent No. 3,046,861                                    July 31, 1962

Vaito K. Eloranta

It is hereby certified that error appears in the above numbered patent requiring correction and that the said Letters Patent should read as corrected below.

Column 10, line 12, for the claim reference numeral "1" read -- 4 --.

Signed and sealed this 15th day of December 1964.

(SEAL)
Attest:

ERNEST W. SWIDER                                 EDWARD J. BRENNER
Attesting Officer                                     Commissioner of Patents